Nov. 17, 1925.
D. BROWN
BRAKE
Filed Oct. 8, 1923
1,561,905
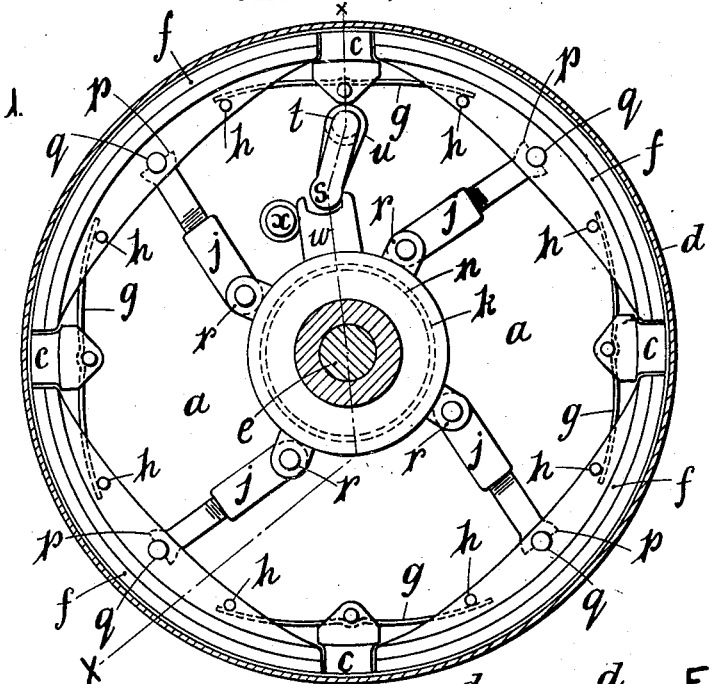
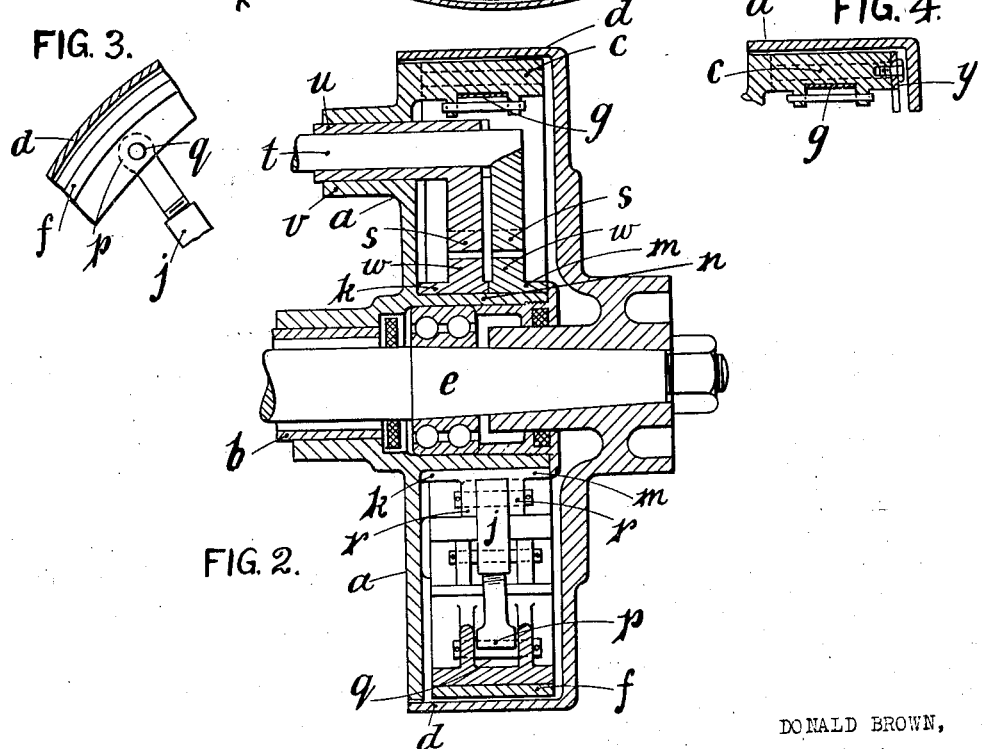
DONALD BROWN,
INVENTOR;
his Attorney Patented Nov. 17, 1925.

1,561,905

UNITED STATES PATENT OFFICE.

DONALD BROWN, OF NEWCASTLE-UPON-TYNE, ENGLAND.

BRAKE.

Application filed October 8, 1923. Serial No. 667,151.

*To all whom it may concern:*

Be it known that I, DONALD BROWN, a subject of the King of Great Britain and Ireland, residing at Newcastle-upon-Tyne, England, have invented new and useful Improvements in and Relating to Brakes, of which the following is a specification.

This invention relates to brakes of the kind comprising one or more pairs of oppositely-disposed brake shoes normally out of engagement with the internal periphery of a brake drum and adapted to be moved into engagement with said periphery by the partial rotation of a central ring to which the brake shoes are connected by links pivoted to the shoes and to opposite sides of the ring. The object of my invention is to provide an improved construction.

A brake in accordance with my invention is characterized in that the brake shoes coact with fixed stops but are floating in so far that, whilst, when in action, one end of each shoe bears against a fixed stop to prevent the shoe rotating with the brake drum, said shoes are free to adjust themselves to the internal periphery of the brake drum, to compensate for wear, about a pin disposed centrally of the shoe which forms a bearing for one end of a link the other end of which is pivoted to the central operating ring. Springs within the brake drum may be employed for retracting the shoes, in which case said springs may be carried by the fixed stops between the shoes and bear on pins near the ends of the shoes but are not positively attached thereto. Or the shoes may be positively retracted by the links connecting them to the central operating ring and the springs within the drum dispensed with, in which case the links are positively pivoted to the central pins of the shoes. The means for partially rotating the central operating ring preferably comprise a finger on a revoluble shaft disposed eccentrically of the central ring. The links are preferably adjustable to facilitate fitment during assembly. The shoes balance each other. Where a single pair is employed, each shoe may engage nearly half the internal periphery of the brake drum and almost the whole of the frictional surface is utilized. In the preferred construction however two pairs of shoes are provided each shoe engaging nearly 90° of the drum, the operating ring and the means for partially rotating same being duplicated thus forming two independently actuated brakes either or both of which can be engaged with the brake drum.

I will more fully describe my invention with reference to the accompanying drawings wherein Figure 1 is an elevation and Figure 2 a section on the line X—Y in Fig. 1 of a brake in accordance therewith. Figure 3 is a part similar view to Fig. 1, and Figure 4 is a part similar view to Fig. 2 illustrating modifications.

Referring to Figs. 1 and 2 of the drawings, in the example therein illustrated, $o$ is a stationary carrier mounted upon the live shaft casing $b$ and provided with four stops $c$ projecting into the brake drum $d$ which is mounted on and rotates with the live shaft $e$, said stops being 90° apart. The brake shoes $f$, of which there are four, are disposed between said stops $c$, and their segmental faces are normally retracted from the internal periphery of the drum $d$ by leaf springs $g$ carried by the stops $c$, the spring carried by each stop extending on each side thereof and engaging a pin $h$ near the end of each of the two shoes $f$ abutting against the stop. Each opposite pair of shoes is coupled by links $j$ to a central operating ring $k$ or $m$, the two operating rings $k$, $m$ being disposed side by side on a central boss $n$ on the carrier $a$. Each link $j$ comprises two members, the outer of which is adapted to be screwed into the inner so that the length of the link can be adjusted to facilitate fitment during assembly. The outer member of each link $j$ is formed with a half-bearing $p$ engaging a central pin $q$ on the shoe $f$, and the inner member of each link is pivoted in lugs $r$ on its operating ring $k$ or $m$. The links $j$ of each pair of shoes $f$ are arranged on opposite sides of the rings so that partial rotation of the corresponding operating ring $k$ or $m$ in one direction moves the shoes radially outwards to bring their segmental surfaces into equal frictional contact with the interior periphery of the brake drum $d$ against the action of the springs $g$, rotation of the shoes being prevented by the stops $c$. The springs $g$ retract the shoes when the operating ring $k$ or $m$ returns or is returned to normal position. The shoes $f$ may, if desired, be positively connected to their links by making the bearings $p$ surround the pins $q$ as shown in Fig. 3, in which case the springs $g$ may be dispensed with and the operating rings $k$, $m$ used to retract the shoes. The shoes are not positively connected to their springs (if used) or to the stops $c$, but are floating and thus free to adjust themselves equally to the drum and unequal wear of the frictional surfaces of the shoes is avoided.

The means for partially rotating the operating rings $k$, $m$ of the two pairs of shoes may conveniently comprise fingers $s$ on the ends of two shafts $t$, $u$ disposed one within the other and journalled in a bearing $v$ on the carrier $a$ and adapted to be independently rotated, each finger $s$ engaging between a pair of lugs $w$ on the ring $k$ or $m$. A fixed stop $x$ on the carrier $a$ limits the return movement of the rings $k$, $m$.

Where the links $j$ are positively connected to the shoes $f$, the springs for retracting the latter may be disposed outside of the brake drum $d$ on any convenient part of the controlling system; or both internal and external springs may be provided so that, in case of one spring or set of springs breaking or failing to act, the other spring or set of springs would function.

If desired, the unsupported ends of the stops $c$ may be connected together by a ring $y$ as shown in Fig. 4 concentric with the shaft $e$ so that, when one pair of brake shoes is in operation, the strains on the pair of stops $c$ against which the shoes bear is partly transmitted by said ring to the other pair of stops and the unsupported ends of the stops $c$ are strengthened. Or a plate mounted on the boss $n$ could be used for the same purpose.

What I claim as my invention, and desire to secure by Letters Patent is:—

1. A brake comprising a brake drum, floating brake shoes oppositely disposed within said drum and normally out of engagement with the internal periphery thereof, fixed stops within said drum between said shoes but separate therefrom, the ends of said shoes coacting with said stops to limit rotation of said shoes when they come into action, pins near the ends of said shoes, springs for retracting said shoes carried by said fixed stops and bearing freely on said pins, and means for moving said shoes into engagement with the internal periphery of said drum, said means permitting the angular movement of the shoes whereby they are enabled to automatically adjust themselves to said periphery to compensate for wear.

2. A brake comprising a brake drum, floating brake shoes oppositely disposed within said drum and normally out of engagement with the internal periphery thereof, fixed stops within said drum between said shoes but separate therefrom, the ends of said shoes coacting with said stops to limit rotation of said shoes when they come into action, a central operating ring within said drum, links pivoted at one end to said ring and bearing at the other end against pins disposed centrally of said shoes, and means for partially rotating said operating ring to cause said links to move said shoes into engagement with the internal periphery of said drum, said links permitting the shoes to automatically adjust themselves radially and angularly to said periphery to compensate for wear.

3. A brake comprising a brake drum, floating brake shoes oppositely disposed within said drum and normally out of engagement with the internal periphery thereof, fixed stops within said drum between said shoes but separate therefrom, the ends of said shoes coacting with said stops to limit rotation of said shoes when they come into action, a central operating ring within said drum, links pivoted at one end to said ring and bearing at the other end against pins disposed centrally of said shoes, and means for partially rotating said operating ring to cause said links to move said shoes into engagement with the internal periphery of said drum, said links permitting the shoes to automatically adjust themselves radially and angularly to said periphery to compensate for wear, said means comprising a pair of lugs on said operating ring, a revoluble shaft disposed eccentrically of said operating ring, and a finger thereon engaging between said lugs.

4. A brake comprising a brake drum, floating brake shoes oppositely disposed within said drum and normally out of engagement with the internal periphery thereof, fixed stops within said drum between said shoes but separate therefrom, the ends of said shoes coacting with said stops to limit rotation of said shoes when they come into action, a central operating ring within said drum, links pivoted at one end to said ring and pivoted at the other end to pins disposed centrally of said shoes, and means for partially rotating said operating ring to cause said links to move said shoes into engagement with the internal periphery of said drum or to positively retract said shoes from said periphery, said links permitting the shoes to automatically adjust themselves radially and angularly to said periphery to compensate for wear.

In testimony whereof I affix my signature.

DONALD BROWN.